US009375991B2

(12) United States Patent
Awasa (10) Patent No.: US 9,375,991 B2
(45) Date of Patent: Jun. 28, 2016

(54) PRESSURE SHOCK ABSORBER AND VEHICLE SUSPENSION INCLUDING THE SAME (71) Applicant: SHOWA CORPORATION, Gyoda-shi (JP)

(72) Inventor: Shigeki Awasa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/262,938

(22) Filed: Apr. 28, 2014

(65) Prior Publication Data
US 2015/0097323 A1  Apr. 9, 2015

(30) Foreign Application Priority Data

Oct. 4, 2013  (JP) ................. 2013-209721

(51) Int. Cl.
*B60G 17/027* (2006.01)
*B60G 15/06* (2006.01)
*B62K 25/20* (2006.01)
*F16F 9/46* (2006.01)
*F16F 9/56* (2006.01)
*B62K 25/28* (2006.01)
*B62K 25/04* (2006.01)

(52) U.S. Cl.
CPC .......... *B60G 17/0272* (2013.01); *B60G 15/062* (2013.01); *B62K 25/20* (2013.01); *B62K 25/283* (2013.01); *B62K 25/286* (2013.01); *F16F 9/462* (2013.01); *F16F 9/56* (2013.01); *B60G 2202/312* (2013.01); *B60G 2202/32* (2013.01); *B60G 2202/413* (2013.01); *B60G 2204/1242* (2013.01); *B60G 2204/44* (2013.01); *B60G 2204/61* (2013.01); *B60G 2206/41* (2013.01); *B60G 2206/93* (2013.01); *B60G 2300/12* (2013.01); *B60G 2500/324* (2013.01); *B62K 2025/045* (2013.01); *B62K 2025/048* (2013.01)

(58) Field of Classification Search
CPC ................... B60G 2202/312; B60G 2202/154; B60G 17/0272; B60G 15/062; B60G 2204/61
See application file for complete search history.

(56) References Cited

U.S. PATENT DOCUMENTS

| 5,348,112 A | 9/1994 | Vaillancourt |
| 5,664,649 A | 9/1997 | Thompson et al. |
| 2009/0277736 A1* | 11/2009 | McAndrews ........... F16F 9/096 188/314 |
| 2014/0124311 A1* | 5/2014 | Hanawa et al. ................ 188/266 |

FOREIGN PATENT DOCUMENTS

| EP | 1621372 A | 2/2006 |
| JP | 58-118408 A | 7/1983 |

(Continued)

OTHER PUBLICATIONS

European Search Report mailed Mar. 20, 2015 for the corresponding European Application No. 14166564.6.

*Primary Examiner* — Vishal Sahni
(74) *Attorney, Agent, or Firm* — Leason Ellis LLP (57) ABSTRACT

A pressure shock absorber includes: a spring portion used for a vehicle suspension; a hydraulic jack portion which can adjust a preload of the spring portion; and a connecting portion through which a hydraulic pressure source supplying hydraulic pressure to the hydraulic jack portion is connected to the hydraulic jack portion, in which the connecting portion can be connected to and separated from the hydraulic pressure source.

6 Claims, 10 Drawing Sheets

(56) References Cited

FOREIGN PATENT DOCUMENTS

| | | | |
|---|---|---|---|
| JP | 05-139696 A | 6/1993 |
| JP | 10-205572 A | 8/1998 |
| JP | 2008-232213 A | 10/2008 |
| JP | 2009-227118 A | 10/2009 |

\* cited by examiner

PRESSURE SHOCK ABSORBER AND VEHICLE SUSPENSION INCLUDING THE SAME

CROSS-REFERENCE TO RELATED APPLICATIONS

This application is based on and claims priority under 35 U.S.C. 119 from Japanese Patent Application No. 2013-209721 filed on Oct. 4, 2013, the entire content of which is incorporated herein by reference.

BACKGROUND

1. Technical Field

The present invention relates to a pressure shock absorber and a vehicle suspension including the pressure shock absorber.

2. Related Art

A vehicle suspension is generally provided with a pressure shock absorber having a damping force generating mechanism and a spring portion. There exists a pressure shock absorber in which a preload of the spring portion can be adjusted by a built-in jack.

For example, a pressure shock absorber having a hydraulic jack portion is shown in JP-A-2009-227118 (Patent Document 1). In the pressure shock absorber, an adjusting portion including large and small cylinders is formed integrally with the hydraulic jack portion through a hydraulic hose to thereby adjust the preload applied to the spring portion.

In jack portions using air pressure, there is one in which an air-pressure hose and the adjusting portion are separated from the jack portion after the preload of the spring portion is adjusted by the adjusting portion.

Regarding the connection between the jack portion and a pressure source, it is known that a connection connector is used as shown in JP-A-2008-232213 (Patent Document 2) and that a plug on the jack portion side and a socket on the pressure source side connected to the plug so as to be detachable are used as shown in JP-A-H05-139696 (Patent Document 3).

SUMMARY OF INVENTION

For example, in the case of the hydraulic jack device as shown in Patent Document 1, the hydraulic hose and the adjusting portion are integrally mounted on a vehicle in addition to the hydraulic jack portion, therefore, the pressure shock absorber becomes heavy. In addition, a wide space for mounting has to be secured on the vehicle side, therefore, the vehicle tends to take up much space.

In the case of the air-pressure type jack portion as described above, there is a disadvantage that the preload of the spring portion can be adjusted only in the environment where equipment capable of supplying high-pressure air by a high-pressure compressor is available.

In view of the above, an illustrative aspect of the present invention is to provide a pressure shock absorber which can be reduced in weight and can increase space efficiency of the vehicle as well as capable of adjusting the preload of the spring portion in simple equipment.

[1] In an aspect of the present invention, there is provided a pressure shock absorber including a spring portion used for a vehicle suspension, a hydraulic jack portion which can adjust a preload of the spring portion and a connecting portion through which a hydraulic pressure source supplying hydraulic pressure to the hydraulic jack portion is connected to the hydraulic jack portion, in which the connecting portion can be connected to and separated from the hydraulic pressure source.

[2] A connecting plug may be provided as the connecting portion in the hydraulic jack portion, and a connecting socket which can be connected to and separated from the connecting plug may be provided in the hydraulic pressure source.

[3] After the preload of the spring portion is set by the hydraulic pressure source, a vehicle including the vehicle suspension may be allowed to run in a state where the connecting socket is separated from the connecting plug.

[4] The pressure shock absorber may have a configuration in which, the hydraulic jack potion has an annular member and a piston portion which is fitted to an outside of the annular member and is movable in a same direction to the annular member, the connecting portion is mounted to the piston portion, a pressure chamber is formed between the annular member and the piston portion and can communicate with the hydraulic pressure source, and the preload of the spring portion is adjusted by a pressure of the pressure chamber.

[5] The pressure shock absorber may have a configuration in which, the hydraulic jack portion has an annular housing to which the connecting portion is mounted and a piston portion which is fitted to the annular housing and is movable in a same axial direction as the annular housing, a pressure chamber is formed between the annular housing and the piston portion and can communicate with the hydraulic pressure source, and the preload of the spring portion is adjusted by a pressure of the pressure chamber.

[6] The hydraulic jack portion may have a piston portion pressing the spring portion, and the piston portion may include plural adjusting piston portions arranged annularly around a central axis line of the spring portion, and the spring portion may be pressed by the plural adjusting piston portions.

[7] In another aspect of the present invention, there is provided a pressure shock absorber including a body portion including a spring portion used for a vehicle suspension and a hydraulic jack portion which can adjust a preload of the spring portion, and a hydraulic pressure source supplying hydraulic pressure to the hydraulic jack portion of the body portion, in which the body portion can be connected to and separated from the hydraulic pressure source through a connecting portion provided in the body portion.

[8] In another aspect of the present invention, there is provided a vehicle suspension including a pressure shock absorber including a spring portion used for a vehicle suspension, a hydraulic jack portion which can adjust a preload of the spring portion and a connecting portion through which a hydraulic pressure source supplying hydraulic pressure to the hydraulic jack portion is connected to and separated from the hydraulic jack portion, in which, after the preload of the spring portion is set by the hydraulic pressure source, a vehicle including the vehicle suspension is allowed to run with the pressure shock absorber in a state where the hydraulic pressure source is separated from the connecting portion.

With the configuration of [1], the connecting portion can be connected to and separated from the hydraulic pressure source. Accordingly, it is possible to provide a pressure shock absorber which can be reduced in weight and can increase space efficiency of the vehicle as well as capable of adjusting the preload of the spring portion in simple equipment.

With the configuration of [2], the connecting plug is provided in the hydraulic jack portion, and the connecting socket which can be connected to and separated from the connecting plug is provided in the hydraulic pressure source, therefore, the hydraulic jack portion can be connected to and separated from the hydraulic pressure source easily by the connection and separation between the connecting plug and the connecting socket.

With the configuration of [3], the vehicle is allowed to run while maintaining the separation between the connecting plug and the connecting socket, therefore, the vehicle is allowed to run in the state of reduced weight.

With the configuration of [4] or [5], it is possible to adjust the preload of the spring portion in simple equipment.

With the configuration of [6], the spring portion may be pressed by the plural adjusting piston portions, therefore, for example, application of small-sized adjusting pistons will contribute to weight reduction in the hydraulic jack portion.

With the configuration of [7], the pressure shock absorber is formed so that the body portion can be connected to and separated from the hydraulic pressure source through the connecting portion provided in the body portion. Therefore, it is possible to provide a pressure shock absorber which can be reduced in weight and can increase space efficiency of the vehicle as well as capable of adjusting the preload of the spring portion in simple equipment.

With the configuration of [8], the vehicle is allowed to run with the pressure shock absorber in a state where the hydraulic pressure source is separated from the connecting portion. Accordingly, it is possible to provide a vehicle suspension which can be reduced in weight and can increase space efficiency of the vehicle as well as capable of adjusting the preload of the spring portion in simple equipment.

DESCRIPTION OF EMBODIMENTS

Hereinafter, embodiments of the present invention will be explained in detail with reference to the attached drawings.

Figure 1:
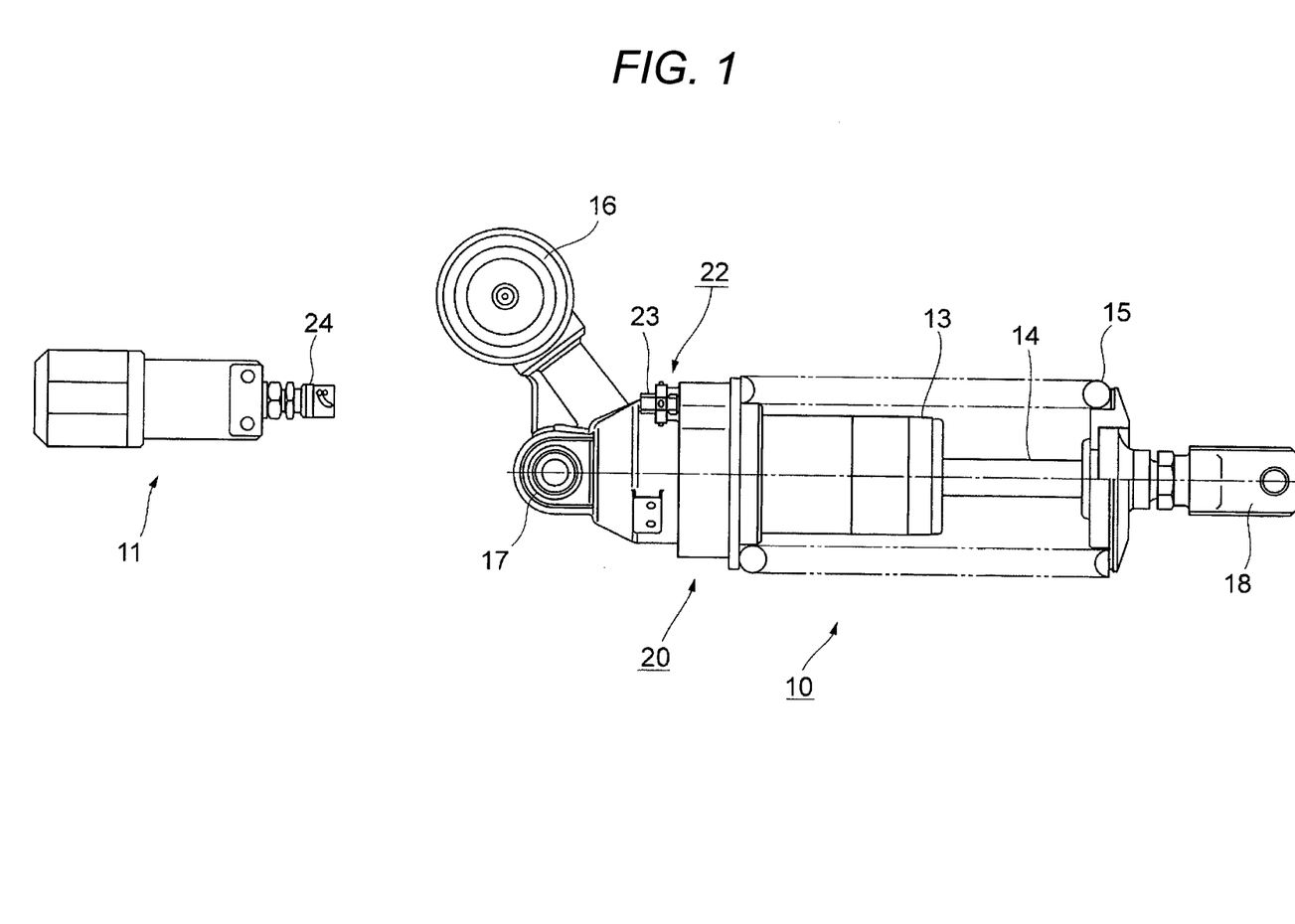
FIG. 1 is a structural view showing a pressure shock absorber according to an embodiment in a state where an adjuster portion is separated.
Figure 2:
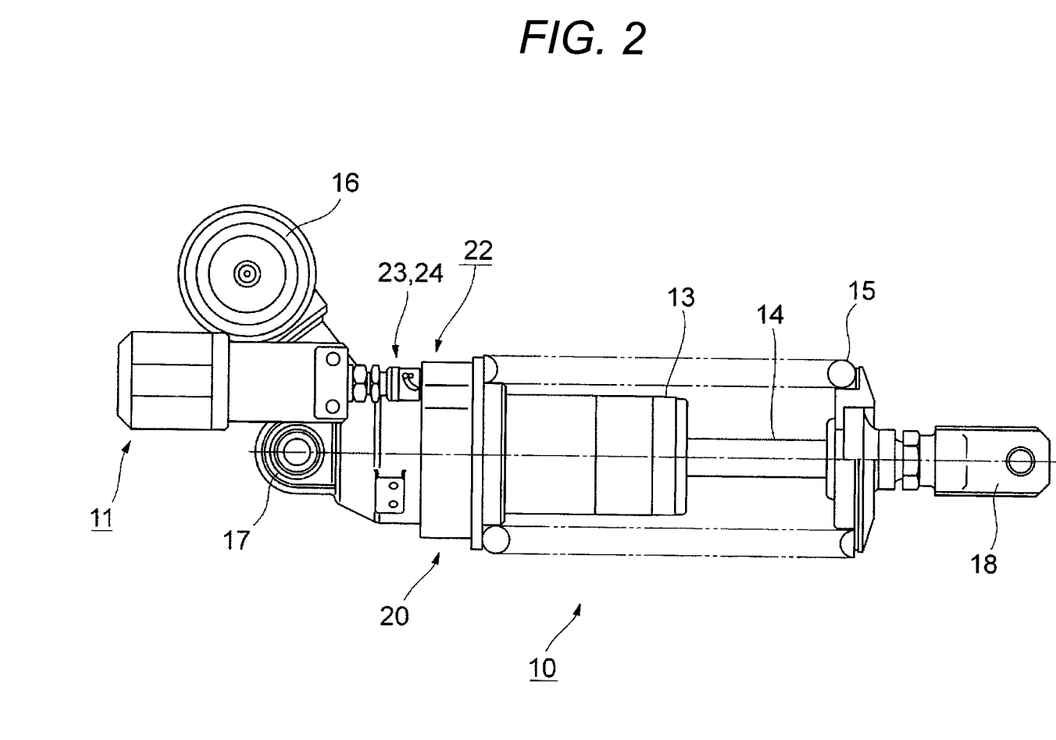
FIG. 2 is a structural view showing the pressure shock absorber according to the embodiment in a state where the adjuster portion is connected.

FIG. 1 is a structural view showing a pressure shock absorber 10 according to the embodiment in a state where an adjuster portion 11 is separated. FIG. 2 is a structural view showing the pressure shock absorber 10 according to the embodiment in a state where the adjuster portion 11 is connected.

The pressure shock absorber 10 includes a cylinder portion 13 having a damping force generating mechanism inside, a piston rod portion 14 and a spring portion 15 for supporting a load and absorbing vibration. The pressure shock absorber 10 is provided with a fluid sub-tank 16 which separately stores fluid (gas or liquid) included in the cylinder portion 13. The cylinder portion 13 is attached to a vehicle body side by means of a mounting member 17 provided at one end of the pressure shock absorber 10. The piston rod portion 14 is attached on a wheel side by means of a mounting member 18 provided at the other end of the pressure shock absorber 10. The pressure shock absorber 10 is provided, for example, between a vehicle body and a wheel of a vehicle such as a two-wheeled vehicle, supporting weight of the vehicle body as well as absorbing and dampening shock from wheels. Hereinafter, a side where the mounting member 17 of the pressure shock absorber 10 is provided will be called the vehicle body side, and a side where the mounting member 18 of the pressure shock absorber 10 is provided will be called the wheel side.

The pressure shock absorber 10 is also provided with a hydraulic jack portion 20 adjusting a preload of the spring portion 15 and a connecting portion 22 for connecting the adjuster portion 11 adjusting hydraulic pressure of the hydraulic jack portion 20 on the vehicle body side of the cylinder portion 13. The adjuster portion 11 has a function of supplying working oil to the hydraulic jack portion 20, functioning as a hydraulic pressure source with respect to the pressure shock absorber 10. The adjuster portion 11 also has a function of discharging working oil from the hydraulic jack portion 20.

The hydraulic jack portion 20 will be described later in detail.

The connecting portion 22 includes a connecting plug 23 for supplying and discharging working oil to a later-described pressure chamber 43. The adjuster portion 11 has a connecting socket 24 for being connected to the connecting plug 23 to form a hydraulic circuit and for being separated from the connecting plug 23. The connecting plug 23 and the connecting socket 24 can be cited as an example of realization of reliable connection by using, for example, a bayonet locking mechanism. The connecting plug 23 and the connecting socket 24 apply, for example, flat-face design, in which air intrusion to the hydraulic circuit does not occur at the time of fixing/releasing the coupling of both devices and a non-spill coupling in which liquid drip does not occur when separated.

When the preload of the spring portion 15 is adjusted, the connecting socket 24 of the adjuster portion 11 is connected to the connecting plug 23 as shown in FIG. 2. Then, after the adjustment of the preload of the spring portion 15 is completed, the connecting socket 24 of the adjuster portion 11 is separated from the connecting plug 23 as shown in FIG. 1.

In the following description, a wording of "the pressure shock absorber 10" is used in the sense of including the adjuster portion 11 as a component, for example, at the time of adjustment as well as in the sense of not including it as the component, for example, after the completion of adjustment.

<Hydraulic Jack Portion 20 According to First Configuration Example>

Figure 3:
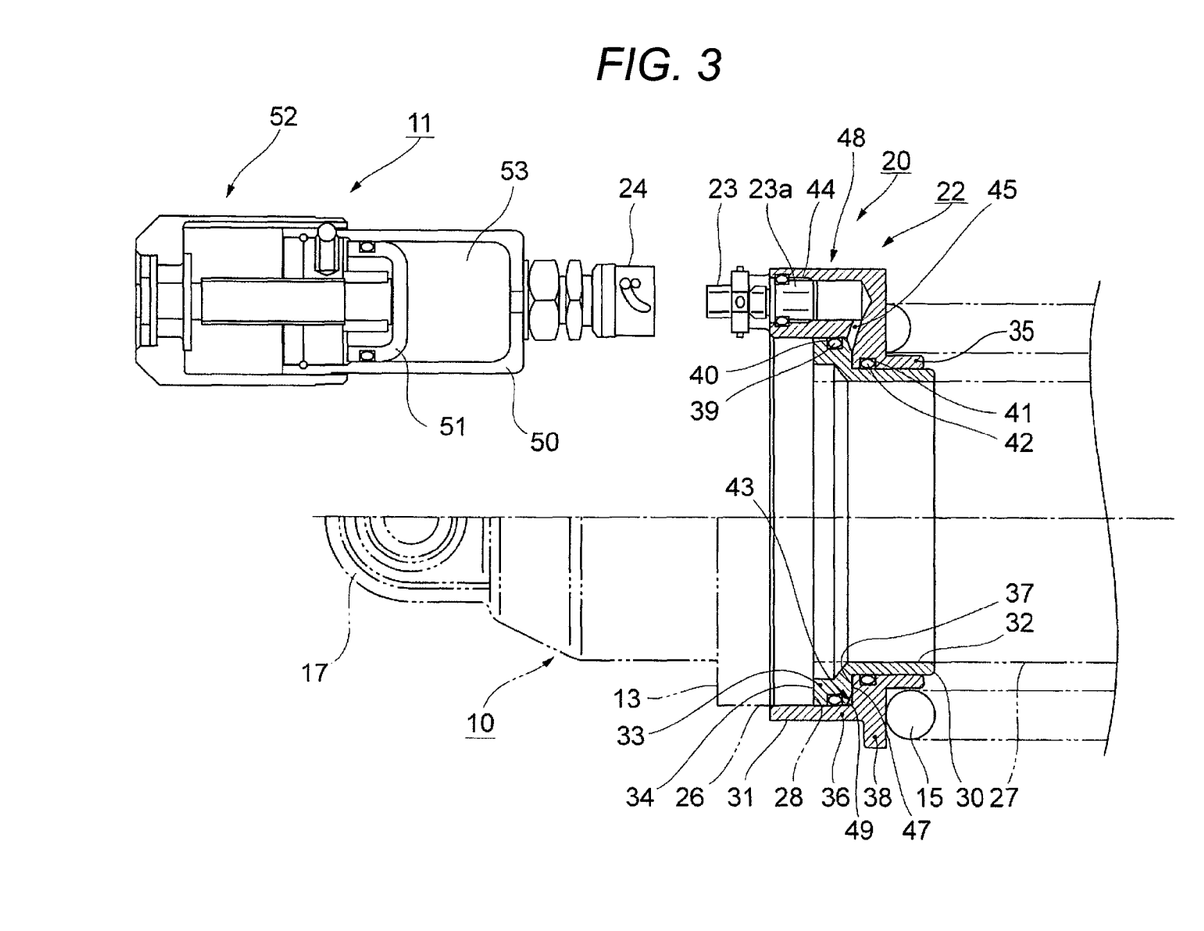
FIG. 3 is a cross-sectional view for explaining a hydraulic jack portion according to a first configuration example.

FIG. 3 is a cross-sectional view for explaining the hydraulic jack portion 20 according to a first configuration example. In FIG. 3, the cylinder portion 13 in a state of being assembled to the hydraulic jack portion 20 is shown by chain double-dashed lines (partial view). A cross section orthogonal to the longitudinal direction of the cylinder portion 13 has a cylindrical shape. The cylinder portion 13 also has a large-diameter portion 26 fitted to the hydraulic jack portion 20 and a small-diameter portion 27 with a smaller diameter than the large-diameter portion 26 on the vehicle body side.

The hydraulic jack portion 20 includes a ring-shaped inside annular member 30 positioned inside and fitted to the small-diameter portion 27 of the cylinder portion 13 and a piston portion 31 fitted to the outside of the inside annular member 30 and movable in the same axial direction to the inside annular member 30.

The inside annular member 30 has a small-diameter portion 32 fitted to the small-diameter portion 27 of the cylinder portion 13, a large-diameter portion 33 on the vehicle body side of the small-diameter portion 32 with a larger diameter than the small-diameter portion 32 and an annular surface 34 abutting on a surface 28 of the cylinder portion 13 which is provided on the end of the vehicle body side of the large-diameter portion 33. Additionally, an annular surface 47 forming a wheel side end portion of the large-diameter portion 33 is formed between the small-diameter portion 32 and the large-diameter portion 33 of the inside annular member 30, and a chamfered portion 49 is formed on the outside of the surface 47 in the radial direction.

The piston portion 31 has a small-diameter portion 35 fitted to the small-diameter portion 32 of the inside annular member 30, a large-diameter portion 36 fitted to the large-diameter portion 33 of the inside annular member 30 and an annular surface 37 forming a vehicle body-side end portion of the small-diameter portion 35 between the small-diameter portion 35 and the large-diameter portion 36. The piston portion 31 also has a mounting portion 48 to which the connecting portion 22 is mounted and a spring bearing portion 38 receiving a vehicle body-side end portion of the spring portion 15.

In the large-diameter portion 33 of the inside annular member 30, a groove 39 which is concave from an outer peripheral surface is formed over the circumference, and a portion between the large-diameter portion 33 and the large-diameter portion 36 of the piston portion 31 are sealed with an O-ring 40 fitted to the groove 39. Moreover, in the small-diameter portion 35 of the piston portion 31, a groove 41 which is concave from an inner peripheral surface is formed over the circumference, and a portion between the small-diameter portion 35 and the small-diameter portion 32 of the inside annular member 30 is sealed with an O-ring 42 fitted to the groove 41. Then, the pressure chamber 43 is formed in a space between an outer surface of the inside annular member 30 and an inner surface of the piston portion 31, which is sectioned by the O-ring 40 and the O-ring 42. Here, as the inside annular member 30 has the chamfered portion 49, even when the surface 47 of the inside annular member 30 contacts the surface 37 of the piston portion 31, the pressure chamber 43 with a certain size is formed in a space between the outer surface of the inside annular member 30 and the inner surface of the piston portion 31, particularly in the space between the chamfered portion 49 and the piston portion 31, which is sectioned by the O-ring 40 and the O-ring 42.

A screw hole 44 to which a base end portion 23a of the connecting plug 23 is screwed is formed on a vehicle body-side end portion of the mounting portion 48, and the screw hole 44 is communicated to the pressure chamber 43 through an oil passage 45. The base end portion of the connecting plug 23 is screwed to a female screw formed in the screw hole 44 so that the hydraulic pressure reaches from the connecting plug 23 to the pressure chamber 43.

The adjuster portion 11 has a cylindrical leveling tank 50, a leveling piston 51 and a moving mechanism 52 of the leveling piston 51 inside the leveling tank 50 as shown in FIG. 3.

The moving mechanism 52 has a function of discharging working oil from an oil chamber 53 inside the leveling tank 50 by pressing the leveling piston 51 and a function of recovering working oil into the oil chamber 53 inside the leveling tank 50 by pulling the leveling piston 51. That is, the adjuster portion 11 as the hydraulic pressure source has the function of recovering working oil in addition to the function of supplying working oil in the state where the connecting socket 24 is connected to the connecting plug 23.

Hereinafter, operation of the pressure shock absorber 10 will be explained.

Figure 4A:
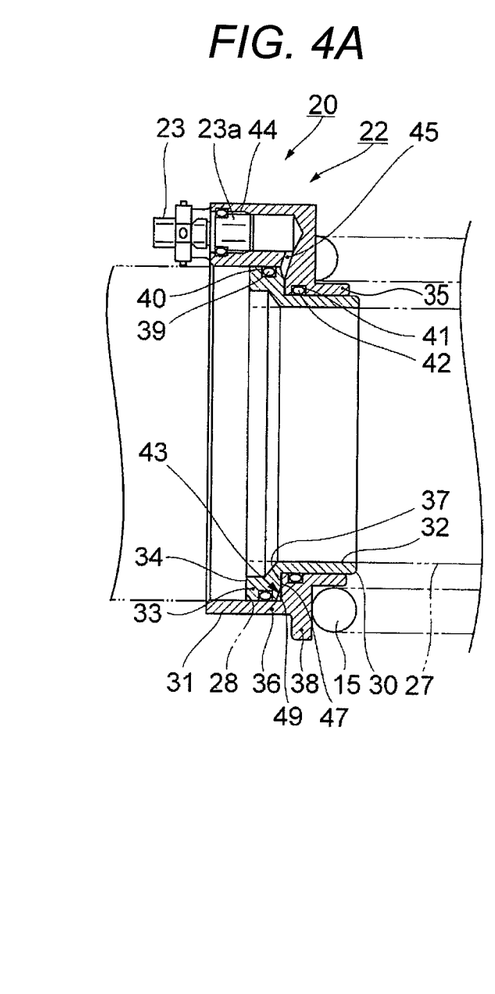
FIGS. 4A to 4C are views for explaining operation of the hydraulic jack portion of FIG. 3.
Figure 4B:
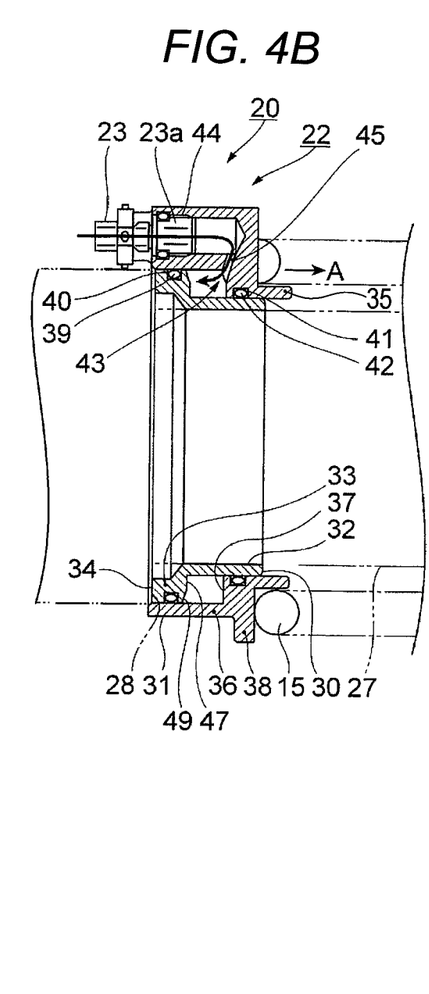
Figure 4C:
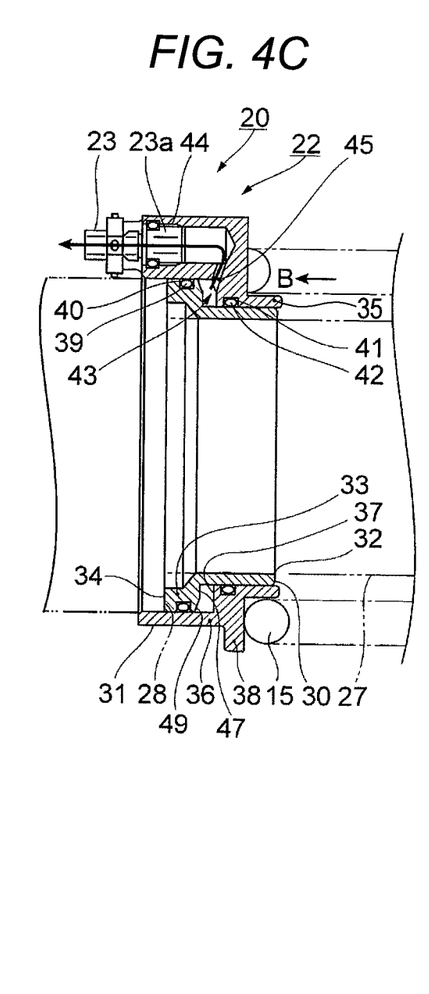

FIGS. 4A to 4C are views for explaining operation of the hydraulic jack portion 20 of FIG. 3. FIG. 4A is an explanatory view showing a state before supplying working oil to the pressure chamber 43, FIG. 4B is an explanatory view showing a state of supplying working oil to the pressure chamber 43 and FIG. 4C is an explanatory view showing a state of discharging working oil from the pressure chamber 43. When supplying working oil to the pressure chamber 43 and when discharging working oil from the pressure chamber 43, the connecting socket 24 of the adjuster portion 11 is connected to the connecting plug 23 provided in the connecting portion 22 securely by using a bayonet locking mechanism as shown in FIG. 2. In FIGS. 4A to 4C, the adjuster portion 11 is not shown.

In the case where the preload of the spring portion 15 is desired to be increased, working oil is supplied to the pressure chamber 43 by the adjuster portion 11 as shown in FIG. 4B. In response to pressure increase inside the pressure chamber 43 due to inflow of working oil, the inside annular member 30 and the piston portion 31 move so as to be apart from each other in the axial direction. As the surface 34 of the inside annular member 30 abuts on the surface 28 of the cylinder 13, the piston portion 31 moves in a direction of the wheel side shown by an arrow A against a spring force of the spring portion 15. Accordingly, the piston portion 31 presses the spring portion 15 and the preload of the spring portion 15 is increased in accordance with the degree of pressure increase inside the pressure chamber 43 by the adjuster portion 11.

Next, in the case where the preload of the spring portion 15 is desired to be reduced, working oil in the pressure chamber 43 is recovered to the oil chamber 53 inside the leveling tank 50 in the adjuster portion 11 by the adjuster portion 11 as shown in FIG. 4C. In response to pressure reduction inside the pressure chamber 43 due to outflow of working oil, the piston portion 31 is pushed back by the spring force of the spring portion 15 and moves in a direction of the vehicle body side shown by an arrow B. Accordingly, the preload of the spring portion 15 is reduced in accordance with the degree of pressure reduction inside the pressure chamber 43 by the adjuster portion 11.

After setting the preload of the spring portion 15, the locking of the bayonet locking mechanism is released and the connecting socket 24 of the adjuster portion 11 is separated from the connecting plug 23 provided in the connecting portion 22. Working oil does not leak either from the plug or the socket as they apply the non-spill coupling. Then, the pressure inside the pressure chamber 43 is maintained in the pressure at the time of setting even after the connecting plug 23 and the connecting socket 24 are separated. Accordingly, the load of the spring portion 15 is also maintained in the set preload even after the connecting plug 23 and the connecting socket 24 are separated.

In the pressure shock absorber 10 having the above structure, the vehicle can run while maintaining the set preload in the state where the adjuster portion 11 is separated. Accordingly, it is not necessary for the vehicle to run in the state where the adjuster portion 11 of the pressure shock absorber 10 is connected on the vehicle body side. Therefore, as it is not necessary to provide a space for connecting the adjuster portion 11 in the vehicle, the space of the vehicle can be efficiently used. Additionally, the pressure shock absorber 10 may be covered by a vehicle cover or the like as long as separation operation of the connecting plug 23 and the connecting socket 24 can be performed. When the readjustment is necessary, the preload can be set again in the same manner by connecting the adjuster portion 11 again.

<Hydraulic Jack Portion 20 According to Second Configuration Example>

Figure 5:
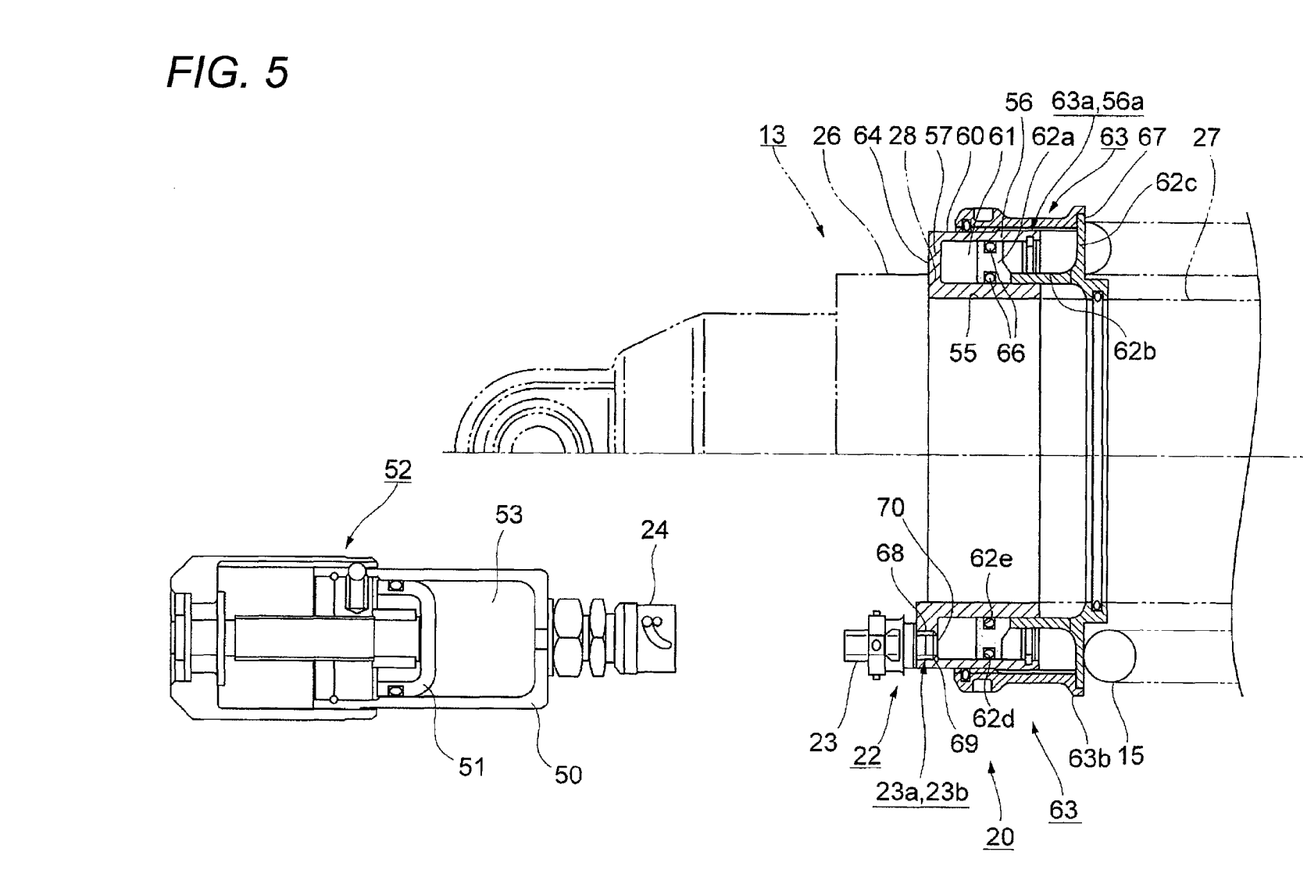
FIG. 5 is a cross-sectional view for explaining a hydraulic jack portion according to a second configuration example.

FIG. 5 is a cross-sectional view for explaining the hydraulic jack portion 20 according to a second configuration example. In FIG. 5, the cylinder portion 13 in a state of being assembled to the hydraulic jack portion 20 is shown by chain double-dashed lines (partial view). The hydraulic jack portion 20 includes an annular housing 60 positioned inside and fitted to the small-diameter portion 27 of the cylinder portion 13, a piston portion 62 which is fitted to the housing 60 to form a pressure chamber 61 between the piton portion 62 and the housing 60 and is movable in the same axial direction as the housing 60, and a positioning mechanism 63 of the piston portion 62.

The housing 60 includes an inside cylindrical portion 55 having a cylindrical shape and arranged inside, an outside cylindrical portion 56 arranged outside of the inside cylindrical portion 55 and having a larger inside diameter than an outside diameter of the inside cylindrical portion 55 and a cover portion 57 connecting one end portions of the inside cylindrical portion 55 and the outside cylindrical portion 56 in the center-line direction to each other so as to cover a space formed by an outer peripheral surface of the inside cylindrical portion 55 and an inner peripheral surface of the outside cylindrical portion 56. The small-diameter portion 27 of the cylinder portion 13 is fitted to an inner peripheral surface of the inside cylindrical portion 55. An end face 64 on a vehicle body side of the cover portion 57 of the housing 60 abuts on the surface 28 of the cylinder 13. On an outer peripheral surface of the outside cylindrical portion 56, a male screw 56a to be fastened to a later-described female screw 63a of the positioning mechanism 63 is formed.

The piston portion 62 has a first cylindrical portion 62a having a cylindrical shape, a second cylindrical portion 62b having a cylindrical shape and extending from an end portion on a vehicle body side of the first cylindrical portion 62a to the wheel side and a flange portion 62c extending from an end portion on a wheel side of the second cylindrical portion 62b to the outside in a radial direction.

On an outer peripheral surface of the first cylindrical portion 62a, an outer peripheral groove 62d which is concave from the outer peripheral surface is formed over the circumference, and on an inner peripheral surface of the first cylindrical portion 62a, an inner peripheral groove 62e which is concave from the inner peripheral surface is formed over the circumference. As a space between the piston portion 62 and the housing 60 is sealed by oil seals 66 fitted to the outer peripheral groove 62d and the inner peripheral groove 62e respectively, the pressure chamber 61 sectioned by the oil seals 66, the outer peripheral surface of the inside cylindrical portion 55, an end face on a wheel side of the cover portion 57 and the inner peripheral surface of the outside cylindrical portion 56 is formed. An end portion on a vehicle body side of the spring portion 15 contacts an end face 67 of the flange portion 62c on the wheel side. A screw hole 69 is formed in the cover portion 57, a female screw 23b into which a male screw 23a of the connecting plug 23 is screwed is formed in the screw hole 69, and a base end portion 68 of the connecting plug 23 is screwed to connect the connecting plug 23 to the housing 60. The screw hole 69 is communicated to the pressure chamber 61 through an oil path 70.

The positioning mechanism 63 has a cylindrical shape, in which the female screw 63a is formed on an inner peripheral surface and a flange bearing 63b contacted by a flange portion 62c of the piston portion 62 is provided on an end portion on the wheel side.

Hereinafter, operation of the pressure shock absorber 10 provided with the hydraulic jack portion 20 according to the second configuration example having the above-described positioning mechanism 63 will be explained.

Figure 6A:
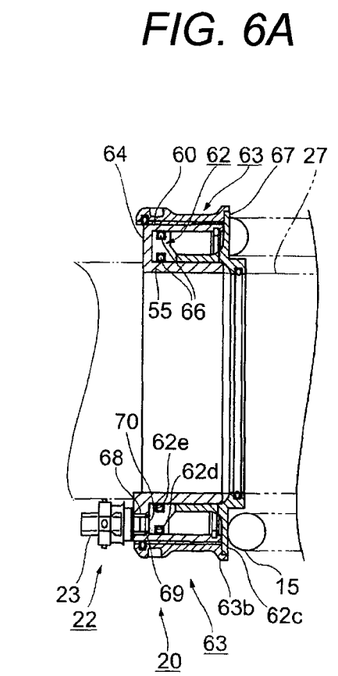
FIGS. 6A to 6D are views for explaining operation of the hydraulic jack portion of FIG. 5.
Figure 6B:
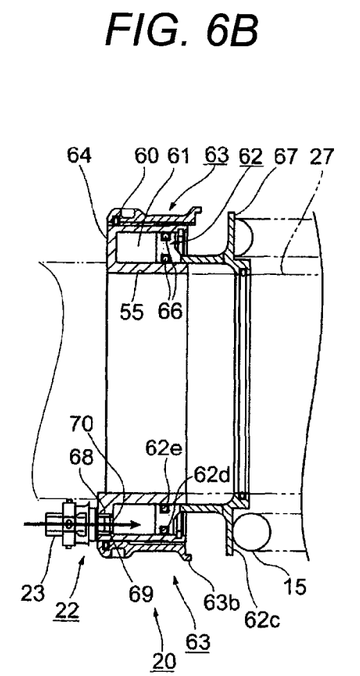
Figure 6C:
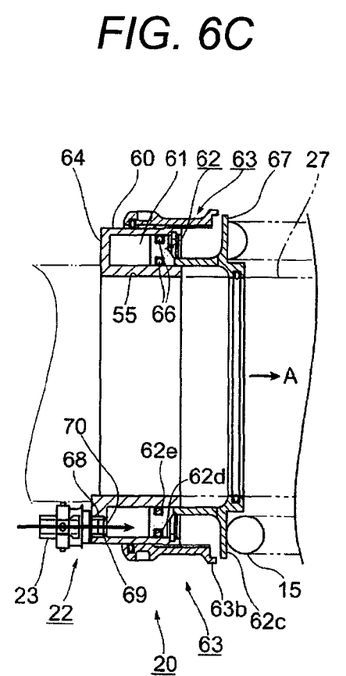
Figure 6D:
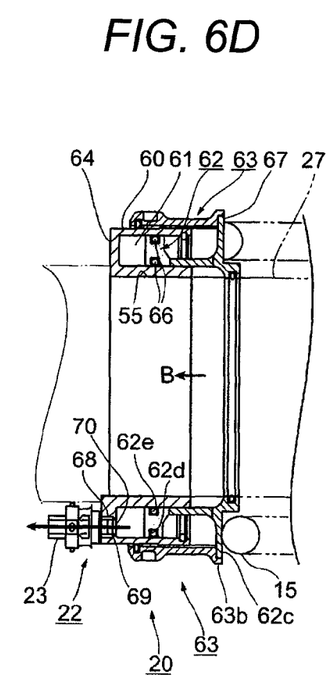

FIGS. 6A to 6D are views for explaining operation of the hydraulic jack portion 20 according to the second configuration example. FIG. 6A is an explanatory view showing a state before supplying working oil to the pressure chamber 61, FIG. 6B is an explanatory view showing a state of supplying working oil to the pressure chamber 61, FIG. 6C is an explanatory view showing a state where the positioning mechanism 63 is moved with respect to FIG. 6B and FIG. 6D is an explanatory view showing a state of discharging working oil from the pressure chamber 61. When supplying working oil to the pressure chamber 61 and when discharging working oil from the pressure chamber 61, the connecting socket 24 of the adjuster portion 11 is connected to the connecting plug 23 in the connecting portion 22 securely by using the bayonet locking mechanism. In FIGS. 6A to 6D, the adjuster portion 11 is not shown.

In the case where the preload of the spring portion 15 is desired to be increased, working oil is supplied to the pressure chamber 61 by the adjuster portion 11. In response to pressure increase inside the pressure chamber 61 due to inflow of working oil, the piston portion 62 moves in the wheel side shown by an arrow A against the spring force of the spring portion 15 (refer to FIG. 6B). Subsequently, a fastening position of the positioning mechanism 63 is fixed to a desired position (refer to FIG. 6C). After that, part of working oil is recovered by the adjuster portion 11. In response to the pressure reduction inside the pressure chamber 61 due to outflow of working oil, the flange portion 62c of the piston portion 62 is pushed back in a direction of the vehicle body side shown by an arrow B until the flange portion 62c of the piston portion 62 abuts on the flange bearing 63b of the positioning mechanism 63 (refer to FIG. 6D). Accordingly, the piston portion 62 is fixed to a desired position by the adjuster portion 11 and the positioning mechanism 63, and the preload of the spring portion 15 is increased with high accuracy.

On the other hand, in the case where the preload of the spring portion 15 is desired to be reduced, first, the positioning mechanism 63 is moved in a loosening direction, next, the working oil is recovered. In response to pressure reduction inside the pressure chamber 61 due to outflow of working oil, the flange portion 62c of the piston portion 62 is pushed back to the vehicle body side until the flange portion 62c abuts on the flange bearing 63b of the positioning mechanism 63. Accordingly, the preload of the spring portion 15 is reduced with high precision by the positioning mechanism 63.

After setting the preload of the spring portion 15, the locking of the bayonet locking mechanism is released and the connecting socket 24 of the adjuster portion 11 is separated from the connecting plug 23. The working oil does not leak either from the plug or the socket as they apply the non-spill coupling. Then, the pressure inside the pressure chamber 61 is maintained in the pressure at the time of setting even after the connecting plug 23 and the connecting socket 24 are separated. Accordingly, the load of the spring portion 15 is also maintained in the set preload after the connecting plug 23 and the connecting socket 24 are separated. Accordingly, the vehicle can run with the set preload after the adjuster portion 11 is separated. As the adjuster portion 11 is a hydraulic type, the piston portion 62 moves rapidly with high precision and accuracy with respect to a small difference of the adjuster portion 11. The positioning mechanism 63 is convenient for finely adjusting the movement of the piston portion 62 with sufficient fine intervals. Accordingly, the preload of the spring portion 15 can be set with high precision by the positioning mechanism 63. When readjustment is necessary, the preload can be set again in the same manner by connecting the adjuster portion 11 again.

When it is desired to suppress the increase in weight due to an oil amount of working oil in the pressure chamber 61, the working oil in the pressure chamber 61 can be discharged. Even when working oil in the pressure chamber 61 is discharged, the preload of the spring portion 15 can be maintained by the function of the positioning mechanism 63.

<Hydraulic Jack Portion 20 According to Third Configuration Example>

Figure 7:
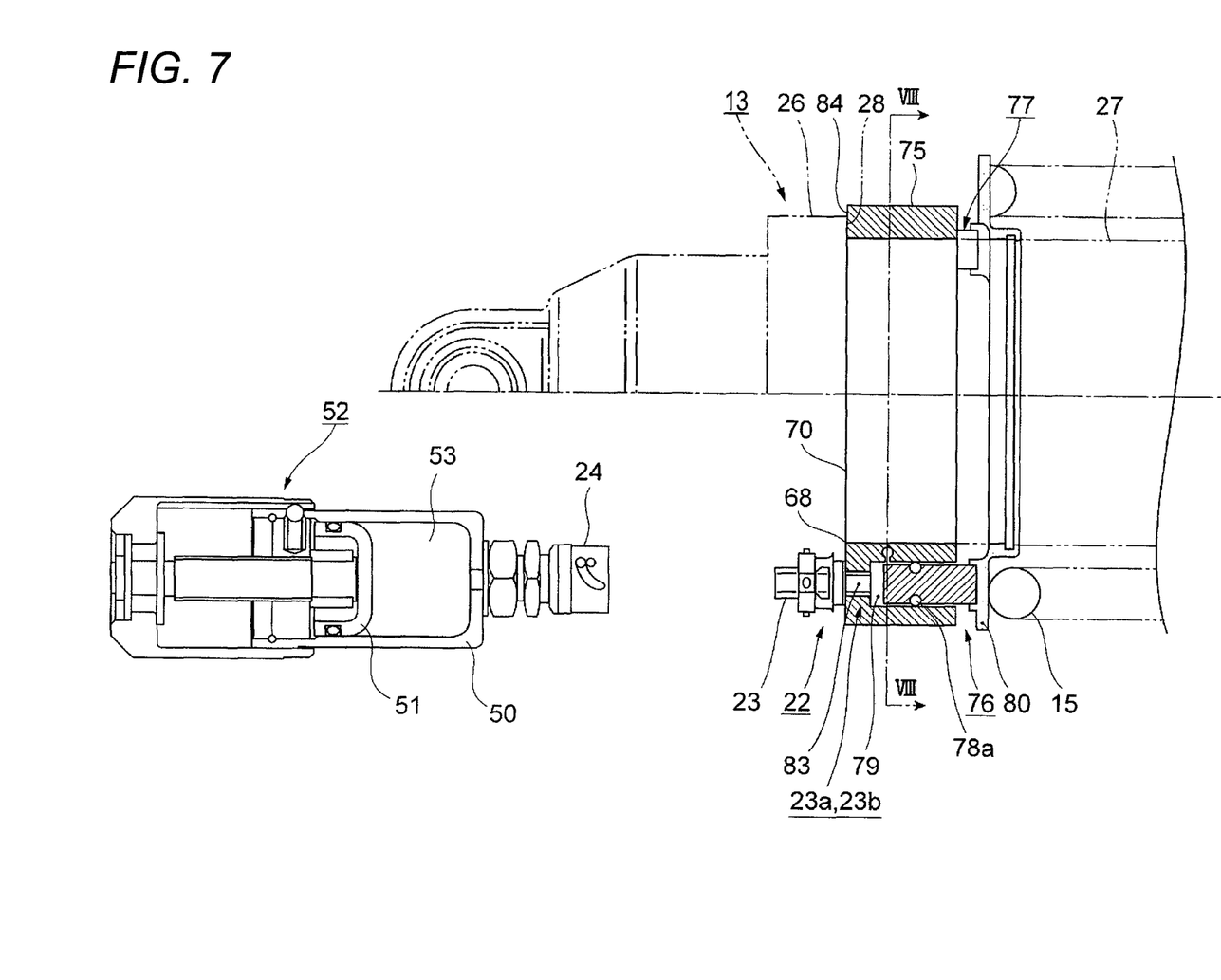
FIG. 7 is a cross-sectional view for explaining a hydraulic jack portion according to a third configuration example.
Figure 8:
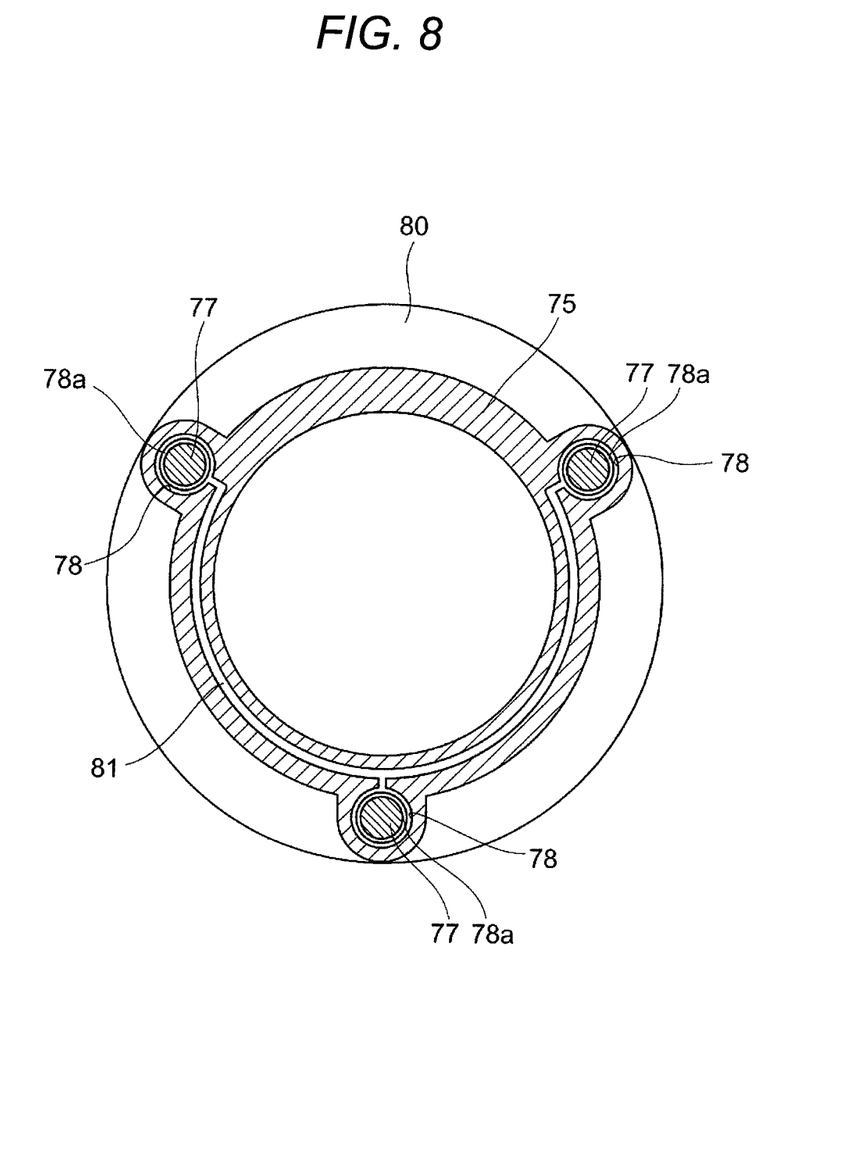
FIG. 8 is a cross-sectional view of the hydraulic jack portion of FIG. 7 cut along VIII-VIII line.

FIG. 7 is a cross-sectional view for explaining the hydraulic jack portion 20 according to a third configuration example. In FIG. 7, the cylinder portion 13 in a state of being assembled to the hydraulic jack portion 20 is shown by chain double-dashed lines (partial view). FIG. 8 is a cross-sectional view of the hydraulic jack portion 20 of FIG. 7 cut along VIII-VIII line.

The hydraulic jack portion 20 according to the third configuration example has an annular housing 75, a piston portion 76 moving with respect to the housing 75 and a spring bearing 80 pressed by the piston portion 76 and contacted by an end portion on the vehicle body side of the spring portion 15.

The housing 75 has a cylindrical shape to be fitted to the small-diameter portion 27 of the cylinder portion 13, having plural (three in this configuration example) piston cylinders 78 with a cylindrical shape with a larger diameter than an outside diameter of later-described adjusting pistons 77 of the piston portion 76, which are provided in a circumference direction at equal intervals, and an oil path 81 for circulating oil among plural piston cylinders 78. An end face 84 on the vehicle body side of the housing 75 abuts on the surface 28 of the cylinder 13.

As shown in FIG. 8, the piston portion 76 has plural (three in this configuration example) cylindrical adjusting pistons 77, which press the spring portion 15 through the spring bearing 80. On an outer peripheral surface of each adjusting piston 77, a groove concave from the outer peripheral surface is formed over the circumference, and an oil seal 78a for sealing between the adjusting piston 77 and an inner peripheral surface of the piston cylinder 78 is fitted to the groove. Pressure chambers 79 are formed inside the piston cylinders 78 by the oil seals 78a. Plural pressure chambers 79 are communicated to one another by the oil path 81.

Moreover, a screw hole 83 is formed on an end portion on the vehicle body side of the housing 75, and the connecting plug 23 is attached to the housing 75 by fastening the base end portion 23a of the connecting plug 23 to the screw hole 83. The screw hole 83 is communicated to one of the plural pressure chambers 79. The pressure generated in the pressure chamber 79 connecting to the screw hole 83 directly extends to other pressure chambers 79 through the oil path 81.

The spring bearing 80 is a disc-like member having a hole in the center, through which the small-diameter portion 27 of the cylinder portion 13 pierces. The plural adjusting pistons 77 contact an end face on the vehicle body side of the spring bearing 80, and the end portion on the vehicle body side of the piston portion 15 contacts an end face on the wheel side of the spring bearing 80.

In the hydraulic jack portion 20 according to this third configuration example, the pressure chambers 79 are formed in plural places (three places in this configuration example) of the housing 75 in the circumferential direction instead of forming the pressure chamber in the cylindrical housing 75 over the circumference. Accordingly, the housing 75 can be reduced in weight as compared with the structure in which the pressure chamber is formed over the circumference. Additionally, the oil path 81 is formed only between the pressure chamber 79 connected to the screw hole 83 and the pressure chambers 79 not connected to the screw hole 83 instead of forming the oil path 81 over the circumference of the housing 75, therefore, the housing 75 is easily formed as compared with a case of forming the oil path over the circumference of the housing 75.

Hereinafter, operation of the pressure shock absorber provided with the hydraulic jack portion 20 according to the third configuration example will be explained.

Figure 9A:
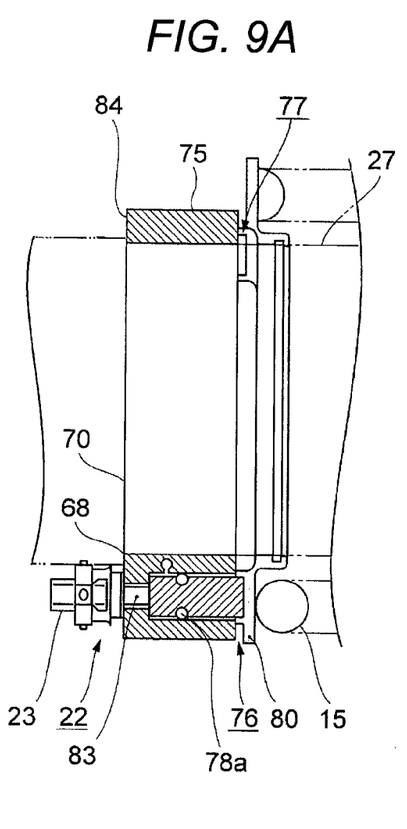
FIGS. 9A to 9C are views for explaining operation of the hydraulic jack portion according to the third configuration example.
Figure 9B:
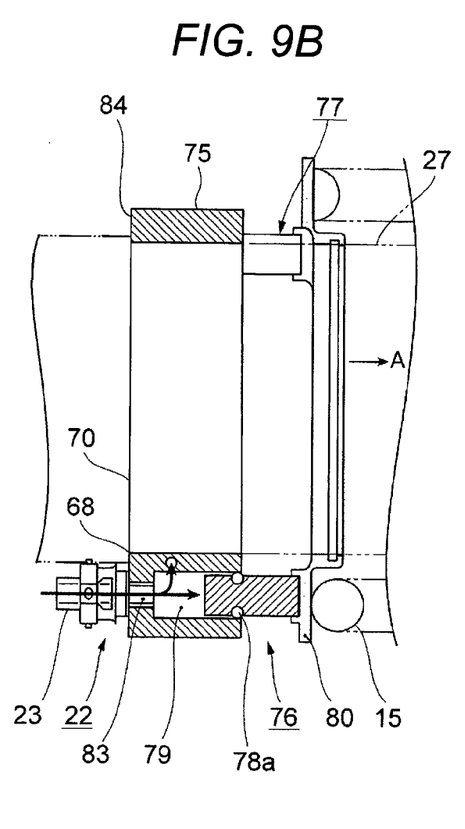
Figure 9C:
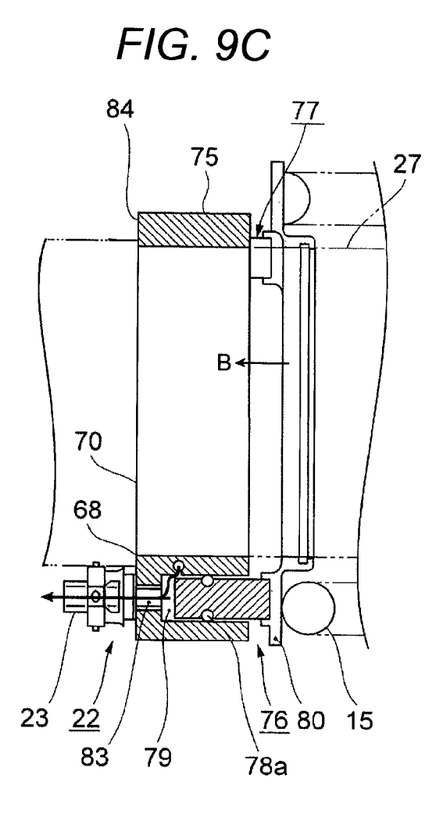

FIGS. 9A to 9C are views for explaining the operation of the hydraulic jack portion 20 according to the third configuration example. FIG. 9A is an explanatory view showing a state before supplying working oil to the pressure chamber 79, FIG. 9B is an explanatory view showing a state of a midway of supplying working oil to the pressure chamber 79 and FIG. 9C is an explanatory view showing a state of discharging working oil from the pressure chamber 79. When supplying working oil to the pressure chamber 79 and when discharging working oil from the pressure chamber 79, the connecting socket 24 of the adjuster portion 11 is connected to the connecting plug 23 securely by using the bayonet locking mechanism. In FIGS. 9A to 9C, the adjuster portion 11 is not shown.

In the case where the preload of the spring portion 15 is desired to be increased, the working oil is supplied to the pressure chamber 79 by the adjuster portion 11 as shown in FIG. 9B and supplied to other pressure chambers 79 through the oil path 81. In response to pressure increase inside the pressure chambers 79 due to inflow of working oil, respective adjusting pistons 77 move in a direction of the wheel side shown by an arrow A against a spring force of the spring portion 15. Accordingly, in accordance with the degree of pressure increase inside the pressure chambers 79 by the adjuster portion 11, the piston portion 76 presses the spring portion 15, and the preload of the spring portion 15 is increased.

Generally, a hydraulic system can obtain high pressure with simple equipment as compared with an air pressure system, therefore, the piston with a small pressure-receiving area can generate sufficient pressing force. As the hydraulic system is used in this configuration example, the diameter of plural adjusting pistons 77 can be smaller, and for example, pin-type pistons can be used as the adjusting pistons 77. Accordingly, contribution to size reduction of the housing 75 is realized, which reduces weight of the overall pressure shock absorber 10 and improve space efficiency.

On the other hand, in the case where the preload of the spring portion 15 is desired to be reduced, part of working oil is recovered by the adjuster portion 11 as shown in FIG. 9C. In response to pressure reduction inside the pressure chambers 79 due to outflow of working oil, the adjusting pistons 77 are pushed back by the spring force of the spring portion 15 and move in a direction of the vehicle body side shown by an arrow B. Accordingly, the preload of the spring portion 15 is reduced in accordance with the degree of pressure reduction inside the pressure chambers 79 by the adjuster portion 11.

After setting the preload of the spring portion 15, the locking of the bayonet locking mechanism is released, and the connecting socket 24 of the adjuster portion 11 is separated from the connecting plug 23 provided in the connecting portion 22. The working oil does not leak either from the plug or the socket as they apply the non-spill coupling. Then, the pressure inside the pressure chambers 79 is maintained in the pressure at the time of setting even after the connecting plug 23 and the connecting socket 24 are separated. Accordingly, the load of the spring portion 15 is also maintained in the set preload after the connecting plug 23 and the connecting socket 24 are separated. The vehicle can run while maintaining the set preload after the adjuster portion 11 is separated.

The connecting socket 24 is directly attached to the adjuster portion 11 in the above configuration examples, however, a hydraulic hose may be attached to the adjuster portion 11 and the connecting socket 24 may be attached to a tip of the hydraulic hose.

[Vehicle Suspension Having Pressure Shock Absorber]

Figure 10:
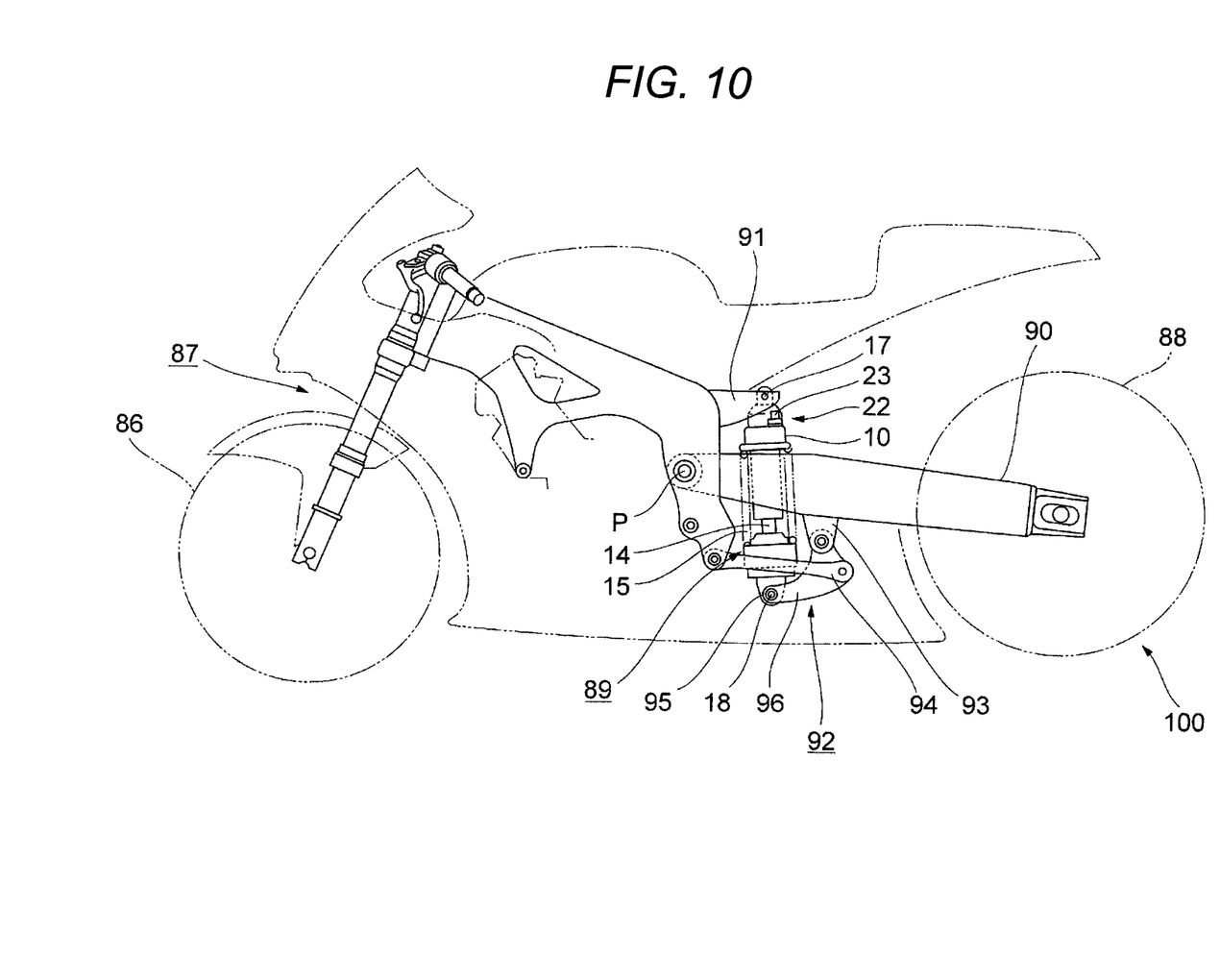
FIG. 10 is a structural view for explaining a vehicle suspension including the pressure shock absorber to which the embodiment is applied.

FIG. 10 is a structural view for explaining a vehicle suspension provided with the pressure shock absorber 10 to which the embodiment is applied. FIG. 10 shows a vehicle suspension 100 applied to a motorcycle. The vehicle suspension 100 has a front suspension 87 suspending a front wheel 86 and a rear suspension 89 suspending a rear wheel 88.

The rear suspension 89 includes a swing arm 90 one end of which attached so as to vertically swing through a pivot axis P of a vehicle frame and the other end of which supports the rear wheel 88, a supporting portion 91 of the vehicle frame supporting the mounting member 17 on the vehicle body side of the pressure shock absorber 10 above the swing arm 90 and a link mechanism 92 connecting to the wheel side through the swing arm 90 below the swing arm 90. The link mechanism 92 includes a lower extension potion 93 of the swing arm 90 and a rod 94 attached to the vehicle frame so as to be rotatable. The link mechanism 92 also has an arm 96 supported by the lower extension portion 93 and the rod 94. The arm 96 includes a supporting portion 95 supporting the mounting member 18 on the wheel side of the pressure shock absorber 10 at one end. Then, the pressure shock absorber 10 forms part of the vehicle suspension 100 by connecting the mounting member 17 to the supporting portion 91 and connecting the mounting member 18 to the supporting portion 95. The connecting plug 23 in the connecting portion 22 of the pressure shock absorber 10 is provided at a position where the connecting plug 23 does not interfere with the swing arm 90 and the supporting portion 91.

In the vehicle suspension 100 including the pressure shock absorber 10, after the preload of the spring portion 15 is set, the connecting socket 24 of the adjuster portion 11 can be separated from the connecting plug 23 of the connecting portion 22 by releasing the locking of the bayonet locking mechanism. The value of the preload of the spring portion 15 is maintained to the set value even after the connecting plug is separated from the connecting socket. Accordingly, the vehicle can be driven while maintaining the set preload after separating the adjuster portion 11. When readjustment is necessary, the preload can be set again in the same manner by attaching the adjuster portion 11 again.

Though the mounting member 17 of the pressure shock absorber 10 is attached to the vehicle body side and the mounting member 18 of the pressure shock absorber 10 is attached to the wheel side in the above embodiment, the present invention is not limited to this, and the mounting member 17 of the pressure shock absorber 10 may be attached to the wheel side and the mounting member 18 of the pressure shock absorber 10 may be attached to the vehicle body side.

The in the above configuration examples employ the bayonet locking mechanism; however the configuration examples are not limited to the bayonet locking mechanism. Any locking mechanism may be applied to the configuration example as long as the adjuster portion 11 can be connected to and separated from the connecting portion 22.

What is claimed is:

1. A pressure shock absorber comprising:
    a spring portion used for a suspension of a vehicle;
    a hydraulic jack portion which can adjust a preload of the spring portion; and
    a connecting portion through which a hydraulic pressure source supplying hydraulic pressure to the hydraulic jack portion is connected to the hydraulic jack portion,
    wherein the connecting portion can be connected to and disconnected from the hydraulic pressure source,
    a connecting plug is provided in the hydraulic jack portion as the connecting portion,
    a connecting socket is provided in the hydraulic pressure source, said connecting socket being able to be directly connected to and disconnected from the connecting plug,
    the connecting plug and the connecting socket are removably connected using a bayonet locking mechanism,
    the hydraulic pressure source sets the preload, and
    the hydraulic jack portion maintains the preload as the vehicle runs while the connecting socket is separated from the connecting plug.

2. The pressure shock absorber according to claim 1,
    wherein, the hydraulic jack potion has an annular member and a piston portion which is fitted to an outside of the annular member and is movable in a same direction to the annular member,
    the connecting portion is mounted to the piston portion,
    a pressure chamber is formed between the annular member and the piston portion and can communicate with the hydraulic pressure source, and
    the preload of the spring portion is adjusted by a pressure of the pressure chamber.

3. The pressure shock absorber according to claim 1,
    wherein, the hydraulic jack portion has an annular housing to which the connecting portion is mounted and a piston portion which is fitted to the annular housing and is movable in a same axial direction as the annular housing,
    a pressure chamber is formed between the annular housing and the piston portion and can communicate with the hydraulic pressure source, and
    the preload of the spring portion is adjusted by a pressure of the pressure chamber.

4. The pressure shock absorber according to claim 1,
    wherein the hydraulic jack portion has a piston portion pressing the spring portion, and the piston portion includes plural adjusting piston portions arranged annularly around a central axis line of the spring portion, and
    the spring portion is pressed by the plural adjusting piston portions.

5. A pressure shock absorber comprising:
    a body portion including a spring portion used for a suspension of a vehicle and a hydraulic jack portion which can adjust a preload of the spring portion; and
    a hydraulic pressure source supplying hydraulic pressure to the hydraulic jack portion of the body portion,
    wherein the body portion can be connected to and disconnected from the hydraulic pressure source through a connecting portion provided in the body portion, a connecting plug is provided in the hydraulic jack portion as the connecting portion, a connecting socket is provided in the hydraulic pressure source, said connecting socket being able to be directly connected to and disconnected from the connecting plug, the connecting plug and the connecting socket are removably connected using a bayonet locking mechanism, the hydraulic pressure source sets the preload, and the hydraulic jack portion maintains the preload as the vehicle runs while the connecting socket is separated from the connecting plug.

6. A vehicle suspension comprising:

a pressure shock absorber including a spring portion used for a suspension of a vehicle, a hydraulic jack portion which can adjust a preload of the spring portion and a connecting portion through which a hydraulic pressure source supplying hydraulic pressure to the hydraulic jack portion is connected to and disconnected from the hydraulic jack portion, wherein, after the preload of the spring portion is set by the hydraulic pressure source, a vehicle comprising the vehicle suspension is allowed to run with the pressure shock absorber in a state where the hydraulic pressure source is separated from the connecting portion, a connecting plug is provided in the hydraulic jack portion as the connecting portion, a connecting socket is provided in the hydraulic pressure source, said connecting socket being able to be directly connected to and disconnected from the connecting plug, the connecting plug and the connecting socket are removably connected using a bayonet locking mechanism, the hydraulic pressure source sets the preload, and the hydraulic jack portion maintains the preload as the vehicle runs while the connecting socket is separated from the connecting plug.

\* \* \* \* \*